United States Patent [19]

Marshall et al.

[11] 4,273,696
[45] Jun. 16, 1981

[54] POLYVINYLCHLORIDE COMPOSITIONS CONTAINING PHENOXY ALKANOL DICARBOXYLIC ACID ESTER PLASTICIZERS

[75] Inventors: Dennis Marshall; Harry C. Murfitt, both of Wilton, England

[73] Assignee: Imperial Chemical Industries Limited, London, England

[21] Appl. No.: 963,885

[22] Filed: Nov. 27, 1978

[30] Foreign Application Priority Data

Nov. 30, 1977 [GB] United Kingdom ............... 49838/77

[51] Int. Cl.³ .................. C08K 5/10; C07C 69/40; C07C 69/42; C07C 69/44
[52] U.S. Cl. ................ 260/31.4 R; 260/31.8 R; 260/453 R
[58] Field of Search ............ 260/31.2 R, 31.8 R, 260/31.4 R

[56] References Cited

U.S. PATENT DOCUMENTS

| | | | |
|---|---|---|---|
| 3,085,078 | 4/1963 | Fath | 260/31.8 R |
| 3,401,138 | 9/1968 | Brady | 260/31.8 R |

FOREIGN PATENT DOCUMENTS

| | | |
|---|---|---|
| 2435683 | 6/1975 | Fed. Rep. of Germany . |
| 39-21114 | 3/1964 | Japan . |
| 44-22616 | 9/1969 | Japan . |
| 692235 | 6/1953 | United Kingdom ............... 260/31.8 |
| 706117 | 3/1954 | United Kingdom ............... 260/31.8 |
| 757681 | 9/1956 | United Kingdom ............... 260/31.8 |
| 919809 | 2/1963 | United Kingdom ............... 260/31.8 |
| 1182081 | 2/1970 | United Kingdom ............... 260/31.8 |
| 1216838 | 12/1970 | United Kingdom ............... 260/33.4 |
| 1317769 | 5/1973 | United Kingdom ............... 260/31.8 |
| 1358195 | 6/1974 | United Kingdom ............... 260/31.8 |
| 1476384 | 6/1977 | United Kingdom ............... 260/31.8 |

Primary Examiner—Joseph L. Schofer
Assistant Examiner—Peter F. Kulkosky
Attorney, Agent, or Firm—Cushman, Darby & Cushman

[57] ABSTRACT

Compounds of formula

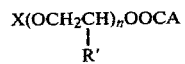

in which X is a phenyl or alkyl phenyl group, A is a phenyl, alkyl phenyl or phenyl alkyl group or a group of formula YCOOZ in which Y is a phenylene or $(CH_2)_m$ group and Z is a group of formula

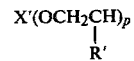

or an alkyl group, X' is a phenyl or alkyl phenyl group, m, n and p are integers and each of R and R' represents either a hydrogen atom or methyl group, are useful as plasticizers for P.V.C.

6 Claims, No Drawings

POLYVINYLCHLORIDE COMPOSITIONS CONTAINING PHENOXY ALKANOL DICARBOXYLIC ACID ESTER PLASTICIZERS

This invention relates to polyvinylchloride compositions and ingredients therefor.

Polyvinylchloride compositions commonly include plasticisers, which improve the cold flex temperatures and render the compositions softer. It is for certain applications a desirable property of the plasticiser that it should have a rapid gelling action with the polyvinylchloride especially in the case of expanded (foamed) polyvinylchloride compositions.

This invention provides plasticisers for polyvinylchloride compositions which exhibit rapid gelling properties either by themselves or blended with other plasticisers.

The invention comprises compounds of formula

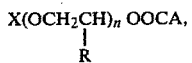

where X is a phenyl or alkyl phenyl group having a total of at most 12 carbon atoms in any alkyl group or groups, A is a phenyl, alkyl phenyl or phenyl alkyl group having 6 to 10 carbon atoms or a group of formula YCOOZ in which Y is a phenylene or $(CH_2)_m$ group in which m is an integer having a value of 1 to 8 and Z is a group of formula

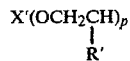

or preferably an alkyl group having 4 to 13 carbon atoms and preferably 6 to 10 carbon atoms, X' is a phenyl or alkyl phenyl group, preferably having a total of at most 12 carbon atoms in any alkyl group or groups, n and p are individually integers in the range 1–5, and each of R and R represents either a hydrogen atom or a methyl group.

The preferred compounds in which Z is an alkyl group as aforesaid, generally have rapid gelling properties in polyvinylchloride compositions; the alternative compounds are generally used in admixture with other plasticisers, especially conventional dialkyl phthalate plasticisers, to secure a rapid gelling effect.

It is preferred that the group —OOCYCOO— should be a residue of phthalic acid or adipic, glutaric or succinic acid, and that R and R are hydrogen atoms and that n and p are preferably one. The group X may be for example a para-nonyl- or octyl-phenyl group or an ortho,meta or para-methyl phenyl group that is preferably an unsubstituted phenyl group.

Plasticisers according to the invention may be used alone or in conjunction with other plasticisers for example dialkyl phthalates, adipates, succinates and/or glutarates of which the alkyl groups have 4 to 13 carbon atoms and preferably 6 to 10 carbon atoms.

Plasticisers according to the invention may be made by condensing one molecule of a phenol or substituted phenol with 1 to 3 molecule of ethylene oxide or propylene oxide to form a phenoxy alcohol and esterifying the product with phthalic, adipic, glutaric or succinic acid or anhydride either alone or together with an alcohol having 4 to 13 and preferably 6 to 10 carbon atoms. In the former case a bis-ester is formed; in the latter case a mixed di-ester is formed together with a bis-ester and the dialkyl ester. If desired the reaction may be carried out in successive stages, an acid anhydride being reacted in the first stage to produce a half ester with a single alcohol for example the phenoxy alcohol, followed by reaction in a second stage with for example a $C_4$ to $C_{13}$ alcohol.

Reaction of the phenol with the ethylene or propylene oxide may be carried out at a temperature of 50–200° C. by passing ethylene or propylene oxide into the molten phenol containing for example 3 to 20% of an alkali metal phenate as catalyst. Esterification of the product with the acid may be carried out for example at a temperature of 100°–180° C. in the presence of an acid catalyst for example sulphuric acid or for example at a temperature of 200° to 300° C. in the presence of a metal catalyst for example a titanium catalyst, which may be provided for example as a tetra alkyl titanate such as tetra iso propyl titanate, a tin catalyst which may be provided for example as a stannous carboxylate or for example alpha alumina. Esterification is preferably carried out with an excess of the total alcoholic materials (phenoxyalcohol plus any other alcohol) which is suitably in the range 5–50% excess. If desired esterification may be carried out at elevated temperatures in the absence of a catalyst. Any catalyst present is suitably removed for example by treatment of the product with an alkali and normally washing with water before the plasticiser is used in a polyvinylchloride composition.

The plasticiser may be incorporated alone or in conjunction with other plasticisers usually in a ratio of total plasticiser to polyvinylchloride of at most 1:1 by weight. It is normally present in a proportion of at least one part by weight per 20 parts by weight of polyvinylchloride. The composition may also comprise stabilisers for example lead, tin, zinc and/or calcium compounds, lubricants for example calcium stearate, pigments and optionally antioxidants and may if desired incorporate fillers in any desired amount for example of up to 80% by weight of the total composition including the filler.

EXAMPLE 1

222 gms phthalic anhydride (1.5 M) was reacted with 240 gms of a condensate of phenol with 1.5 moles of ethylene oxide (1.5 M+3% excess) at 120° C. for 30 minutes to form phenoxyethyl monophthalate. 119 gms of n-butanol (1.5 M+7% excess) were then added plus 5.0 gms p-toluene sulphonic acid as catalyst.

The whole was further reacted at 150° C. for 5 hours under slight vacuum, which was adjusted throughout the reaction to maintain reflux. Reaction water was removed using a Dean and Stark still head. The crude n-butyl phenoxyethyl phthalate product had an acidity of 6.6 mg KOH/gm. This was neutralised by the addition of 2.8 gms caustic soda pellets dissolved in 500 mls of hot water. The product was further washed free from alkali by two additional washes of 500 mls of hot water.

The excess alcohols used were removed by subsequent vacuum steam distillation at 160° C. and 80 mm Hg.

The colour of the finished product can be improved by the addition of 3 gms of activated charcoal at the steam distillation stage. The charcoal is removed by filtration through diatomaceous earth.

The product was a pale-straw coloured liquid with free acidity 0.1 mg KOH/gm and free alcohol content 0.1% w/w.

EXAMPLE 2

262 gms of a mixture of adipic, glutaric and succinic acids was reacted with 278 gms iso octanol (2 M+7% excess) for 15 mins at 100° C. After cooling to 80° C. the reaction water produced (as a lower layer) was discharged.

343 gms of a condensate of phenol (1 mole) with 1.5 moles of ethylene oxide (2 M+7% excess), 3.5 gms p-toluene sulphonic acid (as catalyst) and 3 gms of decolouring charcoal was added.

The mixture was reacted at 140° C. for 1¾ hours after which the acid value was 2.8 mg KOH/gm. The crude iso octyl phenoxyethyl ester was neutralised with 2 gms sodium hydroxide dissolved in 500 mls not water. The product was given a further wash with 500 mls hot water.

The excess alcohols were removed by vacuum steam distillation at 150° C. and 80 mm Hg.

The charcoal was finally removed by filtration through diatomaceous earth.

The product was a light yellow liquid with free acidity of 0.1-0.2 mg KOH/gm, and free alcohol content 0.1% w/w.

EXAMPLE 3

148 gms phthalic anhydride (1 M) was reacted with 304 gms phenoxyethanol (2 M+10% excess) using 0.2 mls of tetra isopropyl titanate as catalyst. A reaction temperature of 200° C. was used giving a reaction time of 2 hours, after which the acid value has less than 0.5 mg KOH/gm.

The excess alcohol was removed by vacuum steam distillation at 170° C. and 80 mm Hg. 0.5 g sodium carbonate was added to the stripper to neutralise. The product was a white solid with a melting point of 59° C.

The products of Example 1 (butyl phenoxyethyl phthalate) and Example 2 (iso octyl phenoxyethyl GAS) were individually evaluated in compositions as follows which are produced by roll milling the constituents at 150° C. for 10 minutes:

| Polyvinylchloride ("Corvic" D65/02) | 100 gms |
| Plasticiser | 50 gms |
| Tri basic lead sulphate | 4 gms |
| Calcium stearate | 1 gm |

The compositions had the following physical characteristics as compared with a similar composition containing butyl benzyl phthalate as plasticiser, as determined in accordance with the relevant British Standard specification.

| | Butyl phenoxy-ethyl Phthalate | Iso-octyl phenoxy-ethyl AGS | Butyl Benzyl Phthalate (Standard) |
|---|---|---|---|
| B.S. Softness | 38 | 46 | 41 |
| Cold Flex Temperature °C. | 1.0 | −16.5 | −1.5 |
| Tensile strength at Break Kgm/cm² | 255 | 214.5 | 228 |
| % Elongation at Break | 300 | 360 | 285 |
| Carbon Volatility (% loss/day) | 0.70 | 0.43 | 0.78 |

The di phenoxyethyl phthalate (Example 3) was similarly evaluated in the following formulation.

| Polyvinylchloride ("Corvic" D65/02) | 100g | Roll |
| Plasticiser | 34g | milled |
| Di iso octyl phthalate | 16g | @ 150° C. |
| Tri basic lead stearate | 4g | for 10 |
| Calcium stearate | 1g | mins |

| | di-phenoxy ethyl phthalate | Butyl Benzyl Phthalate (Standard) |
|---|---|---|
| B.S. Softness | 35 | 41 |
| Cold Flex Temperature °C. | −4.0 | −1.5 |
| Tensile strength at break Kgm/cm² | 231 | 228 |
| % Elongation at break | 300 | 285 |
| Carbon Volatility | 0.23 | 0.78 |

In addition the product of Example 2 was evaluated in the following P.V.C. paste formulation, which was gelled by heating to 100° C. for 10 minutes and then to 160° C. for 2 minutes to give the following formulation:

| Polyvinylchloride ("Corvic" 65/54) | 60 gms |
| Polyvinylchloride ("Corvic" 55/03) | 40 gms |
| Di-iso-octyl phthalate | 30 gms |
| Plasticiser (under test) | 15 gms |
| Cadmium/Zirconium stabiliser (Lankro Mark 702) | 2 gms |

Its physical properties, determined as before were:

| | Plasticiser of Example 2 | Butyl Benzyl phthalate |
|---|---|---|
| B.S. Softness | 32 | 39 |
| Tensile Kgm/cm² | 163 | 233 |
| % Elongation | 235 | 290 |
| Carbon Volatility | 0.37 | 0.45 |

EXAMPLE 4

1.1 moles of phenoxy propanol was esterified with mono iso-octyl phthalate in the presence of 0.2 ml of tetra isopropyl titanate as catalyst. The reaction temperature was 200° C. and the reaction time was 2 hours. The excess phenoxy propanol was removed by vacuum steam distillation at 170° C. at a pressure of 80 mm of mercury, 0.5 g of sodium carbonate being added to remove the catalyst. The product, iso-octyl phenoxypropyl phthalate was then evaluated as in Example 3.

The B.S. softness was 31, the cold flex temperature was 2.5° C., the tensile strength at break was 218 kg per square centimeter, the elongation at break was 310% and the carbon volatility (loss per day) was 0.10%.

EXAMPLE 5

Phenoxy ethanol (1.1 moles) was reacted with mono iso-octyl terephthalate (1 mole) in the presence of 0.2 ml of tetra iso-propyl titanate as catalyst. The reaction temperature was 200° C. and the reaction time was 2 hours. The excess alcohol was removed by steam distillation at 170° C. at a pressure of 80 mm of mercury, 0.5 g of sodium carbonate being added to neutralise the catalyst. The product, iso-octyl phenoxyethyl terephthalate was tested as in Example 3.

The plasticised P.V.C. composition had a softness of 28, a cold flex temperature of 0° C., a carbon volatility of 0.5% per day, a tensile strength at break of 242 kg per square centimetre and an elongation at break of 330%.

EXAMPLE 6

Phenylacetic acid (2 moles, 272 grams) was reacted with 2-phenoxyethanol (2.2 moles, 304 grams) in the presence of p-toluene sulphonic acid (2.5 grams) as catalyst and xylene (75 ml) at a reaction temperature of 150° C. for a period of 3 hours 15 minutes. The conversion of the acid to the ester was greater than 99%. The crude product was washed with 500 ml of hot water containing 1 gram of sodium hydroxide to neutralise the product. The excess alcohol was removed by vacuum steam distillation for 3 hours at 150° C. at a pressure of 80 mm of mercury in the presence of 5 grams of activated charcoal to improve the colour. The product was filtered through Kieselguhr at a temperature of 100° C. The product was a low viscosity liquid light yellow in colour having an acidity less than 0.1 milligrams KOH per gram and a free alcohol content of less than 0.1% by weight.

The product, phenoxyethyl phenylacetate was incorporated into a polyvinylchloride composition comprising 100 parts by weight of polyvinylchloride sold under the trade mark "Corvic" S71/102, 50 parts by weight of the phenoxyethyl phenylacetate, 4 parts by weight tribasic lead sulphate and calcium stearate (1 part by weight).

The B.S. softness was 37, the cold flex temperature was −8.5° C. the tensile strength at break was 245 kg per square centimeter, the elongation at break was 330% and the carbon volatility was 3.4% per day.

EXAMPLE 7

Phenoxyethyl p-toluate was prepared as follows. p-Toluic acid (2 moles, 272 grams), 2-phenoxyethanol (2.2 moles, 304 grams) p-toluene sulphonic acid as catalyst (2 grams) and xylene (50 ml) were heated at 150° C. for 7 hours 45 minutes producing a product which had a final acid value of 8.5 milligrams KOH per gram. The conversion was 97% based on the p-toluic acid.

The crude product was washed with 500 ml of hot water containing 3.5 grams of sodium hydroxide. The excess alcohol was removed by vacuum steam stripping at 150° C. for 3 hours at a pressure of 80 mm of mercury. The product was a yellow solid having an acidity of less than 0.1 milligrams of KOH per gram and a free alcohol content of less than 0.1% by weight.

The product, phenoxyethyl p-toluate was evaluated as in Example 6. The B.S. softness was 36, the cold flex temperature was 2° C., the tensile strength at break was 240 kg per square centimeter, the elongation at break was 310% and the carbon volatility was 2.9% per day.

EXAMPLE 8

Phenoxyethyl p-toluate, phenoxyethyl phenylacetate and iso-octyl phenoxyethyl terephthalate were tested in paste formulation as plasticiser blends.

The pastes were formulated as follows. Polyvinylchloride sold under the trade name "Breon" P130/1 (180 grams) and polyvinylchloride sold under the trade name "Corvic" S61/303 (120 grams) were compounded with the plasticiser blend to be tested (135 grams) and a cadmium/zinc liquid stabiliser (6 grams). The ingredients were charged to a mixer with a paddle stirrer and mixed for 20 minutes under vacuum at a pressure of 50 mm of mercury. Pastes were then spread at a thickness of 20 thousandths of an inch using a Werner Mathis spreading machine with a doctor knife. These sheets were heated for 2 minutes at different temperatures. The temperature at which gelation occurred was assessed using three methods, namely (1) a visual comparison of the clarity of sheets against standards, (2) tensile strength determinations on the sheets, the gelation temperature being estimated by determining the point at which further increases in temperature produced no significant further increase in tensile strength, and (3) a staining test. In the latter, the sheets were stained with brown boot polish by contacting them with the boot polish for 30 seconds and then wiping the polish away. The severity of the stain is reduced as gelation increases. The gelation temperature was assessed visually by comparison with standard sheets.

The plasticiser blends tested and the gelation temperature determined by the three methods are shown below. In the table, Mixed Ester is the iso-octyl ester of a mixture of adipic acid (15% by weight) succinic acid (30%) by weight) and glutaric acid (55% by weight).

| PLASTICISER BLEND | TEST METHOD | GELATION TEMPERATURE |
| --- | --- | --- |
| Phenoxyethyl phenylacetate and Mixed Ester (equal parts by weight) | 1 | 140° C. |
| | 2 | 165° C. |
| | 3 | 150° C. |
| Phenoxyethyl phenylacetate (2 parts by weight) per part by weight of Mixed Ester | 1 | 130/140° C. |
| | 2 | 160° C. |
| | 3 | 140/150° C. |
| Phenoxyethyl phenylacetate and di-iso-octyl phthalate (equal parts by weight) | 1 | 130/140° C. |
| | 2 | 160° C. |
| | 3 | 140° C. |
| Phenoxyethyl phenylacetate (2 parts by weight) to 1 part by weight di-iso-octyl phthalate | 1 | 130/140° C. |
| | 2 | 160° C. |
| | 3 | 130/140° C. |
| Phenoxyethyl phenylacetate (2 parts by weight) + Mixed Ester (1 part by weight) + di-iso-octyl phthalate (1 part by weight) | 1 | 130/140° C. |
| | 2 | 160° C. |
| | 3 | 140° C. |
| Phenoxyethyl phenylacetate (4 parts by weight) + Mixed Ester (1 part by weight) + di-iso-octyl phthalate (1 part by weight) | 1 | 130° C. |
| | 2 | 160° C. |
| | 3 | 140° C. |
| Phenoxyethyl p-toluate (1 part by weight) + Mixed Ester (1 part by weight) | 1 | 140° C. |
| | 2 | 165° C. |
| | 3 | 140/150° C. |
| Phenoxyethyl p-toluate (1 part by weight) + di-iso-octyl phthalate (1 part by weight) | 1 | 140° C. |
| | 2 | 160° C. |
| | 3 | 140° C. |
| Phenoxy p-toluate (2 parts by weight) + Mixed Ester (1 part by weight) + di-iso-octyl phthalate (1 part by weight) | 1 | 140° C. |
| | 2 | 160° C. |
| | 3 | 140° C. |
| Iso-octyl phenoxyethyl terephthalate (1 part by weight) + Mixed Ester (1 part by weight) | 1 | 160° C. |
| | 2 | 170° C. |
| | 3 | 150° C. |
| Iso-octyl phenoxyethyl terephthalate (1 part by weight) + di-iso-octyl phthalate (1 part by weight) | 1 | 150/160° C. |
| | 2 | 160/170° C. |
| | 3 | 150° C. |
| Iso-octyl phenoxyethyl terephthalate (2 parts by weight) + Mixed Ester (1 part by weight) + di-iso-octyl phthalate (1 part by weight) | 1 | 150/160° C. |
| | 2 | 160/170° C. |
| | 3 | 150° C. |

We claim:

1. A polyvinyl chloride composition which is plasticized with a compound of formula:

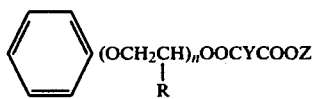

in which
- Y is a phenylene or (CH$_2$)$_m$ group in which m is an integer having a value of 1 to 8,
- Z is an alkyl group having 4 to 13 carbon atoms,
- n is an integer in the range of 1 to 5, and
- R represents either a hydrogen atom or a methyl group.

2. A composition as claimed in claim 1 in which Z is an alkyl group having 6 to 10 carbon atoms.

3. A composition as claimed in claim 2 in which n is one.

4. A composition as claimed in claim 3 in which the group of formula —OOCYCOO— is a residue of phthalic, adipic, glutaric or succinic acid, R is a hydrogen atom and n is one.

5. Polyvinylchloride compositions as claimed in claim 1 which comprise an additional plasticizer.

6. A composition as claimed in claim 5 in which the additional plasticizer comprises a dialkyl phthalate, adipate, succinate and/or glutarate of which the alkyl groups contain 4 to 13 carbon atoms.

* * * * *